United States Patent
Yadav et al.

(10) Patent No.: US 11,507,473 B2
(45) Date of Patent: Nov. 22, 2022

(54) SYSTEM AND METHOD FOR EFFICIENT BACKUP GENERATION

(71) Applicant: EMC IP Holding Company LLC, Hopkinton, MA (US)

(72) Inventors: Sunil Yadav, Bangalore (IN); Shelesh Chopra, Bangalore (IN); Aaditya Rakesh Bansal, Bangalore (IN); Manish Sharma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 73 days.

(21) Appl. No.: 16/669,465

(22) Filed: Oct. 30, 2019

(65) Prior Publication Data

US 2021/0133046 A1    May 6, 2021

(51) Int. Cl.
  *G06F 11/14* (2006.01)
  *G06F 16/23* (2019.01)
  *G06F 16/22* (2019.01)

(52) U.S. Cl.
  CPC ...... *G06F 11/1469* (2013.01); *G06F 11/1451* (2013.01); *G06F 11/1461* (2013.01); *G06F 11/1464* (2013.01); *G06F 16/2228* (2019.01); *G06F 16/2358* (2019.01); *G06F 16/2365* (2019.01); *G06F 2201/84* (2013.01)

(58) Field of Classification Search
  None
  See application file for complete search history.

(56) References Cited

U.S. PATENT DOCUMENTS

| | | |
|---|---|---|
| 6,408,336 B1 | 6/2002 | Schneider et al. |
| 8,554,918 B1 | 10/2013 | Douglis |
| 8,812,455 B1 | 8/2014 | Claudatos et al. |
| 9,298,707 B1 | 3/2016 | Zhang et al. |
| 9,430,332 B1 | 8/2016 | Bahadure |
| 9,772,791 B2 | 9/2017 | Resch |
| 9,977,704 B1 | 5/2018 | Chopra et al. |
| 10,102,083 B1 | 10/2018 | Dobrean et al. |
| 10,320,757 B1 | 6/2019 | Secker-walker |
| 10,417,213 B1 | 9/2019 | Mukku et al. |
| 10,489,066 B1 | 11/2019 | Krinke |
| 10,572,350 B1 | 2/2020 | Bansal et al. |
| 10,642,698 B1 | 5/2020 | Chopra et al. |
| 11,265,148 B1 | 3/2022 | Griffin et al. |
| 11,297,459 B2 | 4/2022 | Raduchel et al. |
| 2008/0086609 A1 | 4/2008 | Lesser et al. |
| 2010/0058114 A1 | 3/2010 | Perkins et al. |
| 2010/0250497 A1 | 9/2010 | Redlich et al. |
| 2011/0113012 A1 | 5/2011 | Gruhl et al. |

(Continued)

*Primary Examiner* — Eddy Cheung
(74) *Attorney, Agent, or Firm* — Chamberlain, Hrdlicka, White, Williams & Aughtry

(57) ABSTRACT

A backup manager for providing backup services includes persistent storage and a backup orchestrator. The persistent storage includes protection policies. The backup orchestrator identifies a last backup generation time for a client in response to a protection policy of the protection policies triggering a backup generation for the client; obtains system metadata for the client; identifies a portion of client data that has been modified since the last backup generation time using the system metadata; generates an incremental backup based on the identified portion of the client data; and stores the incremental backup in backup storage.

13 Claims, 10 Drawing Sheets

(56) References Cited

U.S. PATENT DOCUMENTS

| | | |
|---|---|---|
| 2011/0131185 A1 | 6/2011 | Kirshenbaum |
| 2011/0213928 A1 | 9/2011 | Grube et al. |
| 2013/0091536 A1 | 4/2013 | Manjunath |
| 2014/0115029 A1 | 4/2014 | Baldwin et al. |
| 2014/0136832 A1 | 5/2014 | Klum et al. |
| 2014/0310800 A1 | 10/2014 | Kabra et al. |
| 2014/0351632 A1 | 11/2014 | Grube et al. |
| 2015/0046192 A1 | 2/2015 | Raduchel |
| 2015/0066865 A1 | 3/2015 | Yara |
| 2015/0066866 A1 | 3/2015 | Yara |
| 2015/0169898 A1 | 6/2015 | Lembcke |
| 2015/0242648 A1 | 8/2015 | Lemmey |
| 2016/0034133 A1 | 2/2016 | Wilson et al. |
| 2016/0132521 A1 | 5/2016 | Reininger |
| 2016/0179416 A1 | 6/2016 | Mutha et al. |
| 2016/0274978 A1 | 9/2016 | Strohmenger et al. |
| 2016/0357971 A1 | 12/2016 | Sinha et al. |
| 2016/0371500 A1 | 12/2016 | Huang et al. |
| 2017/0371547 A1* | 12/2017 | Fruchtman .......... G06F 11/1448 |
| 2018/0032446 A1* | 2/2018 | Amarendran ............ G06N 5/02 |
| 2018/0067848 A1 | 3/2018 | Baldwin |
| 2018/0089044 A1 | 3/2018 | Guim Bernat et al. |
| 2018/0157860 A1 | 6/2018 | Nair et al. |
| 2018/0159729 A1 | 6/2018 | Deshmukh et al. |
| 2018/0225177 A1 | 8/2018 | Bhagi et al. |
| 2018/0232528 A1 | 8/2018 | Williamson et al. |
| 2019/0057101 A1 | 2/2019 | Esserlieu et al. |
| 2019/0158596 A1 | 5/2019 | Mcshane et al. |
| 2019/0205056 A1 | 7/2019 | Halstuch |
| 2019/0312910 A1 | 10/2019 | Convertino et al. |
| 2019/0332683 A1 | 10/2019 | Thummala et al. |
| 2019/0354708 A1 | 11/2019 | Fisher et al. |
| 2020/0012431 A1 | 1/2020 | Chopra et al. |
| 2020/0233975 A1 | 7/2020 | Rosenthol et al. |
| 2020/0241908 A1 | 7/2020 | Dornemann et al. |
| 2020/0241975 A1 | 7/2020 | Basham et al. |
| 2020/0285771 A1 | 9/2020 | Dey et al. |
| 2020/0301882 A1* | 9/2020 | Pogde ................. G06F 11/1464 |
| 2020/0302082 A1 | 9/2020 | Carteri et al. |
| 2020/0320208 A1 | 10/2020 | Bhosale et al. |
| 2021/0034571 A1* | 2/2021 | Bedadala .............. G06F 16/134 |
| 2021/0035089 A1 | 2/2021 | Johnston |
| 2021/0117277 A1 | 4/2021 | Shetty et al. |
| 2021/0133040 A1 | 5/2021 | Bansal et al. |
| 2021/0133248 A1 | 5/2021 | Sharma et al. |

* cited by examiner

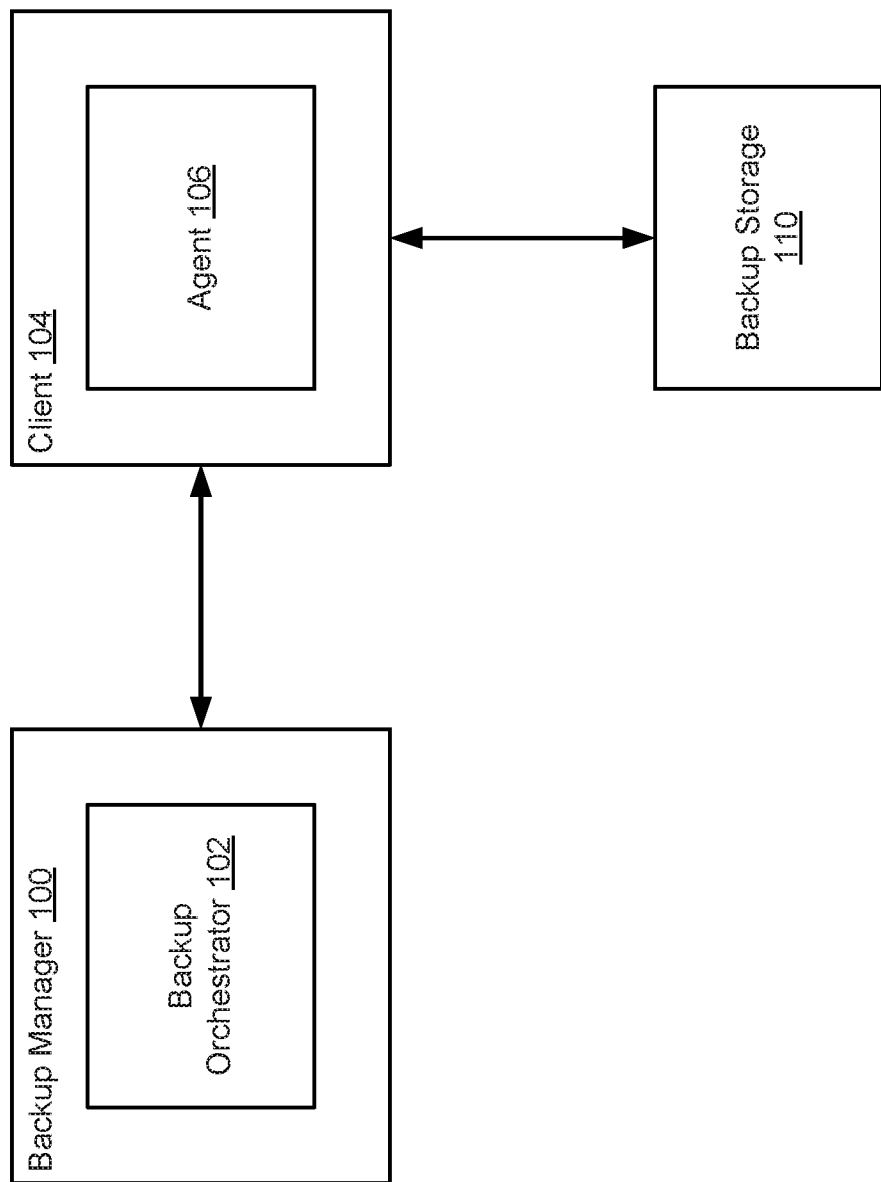
FIG. 1.1

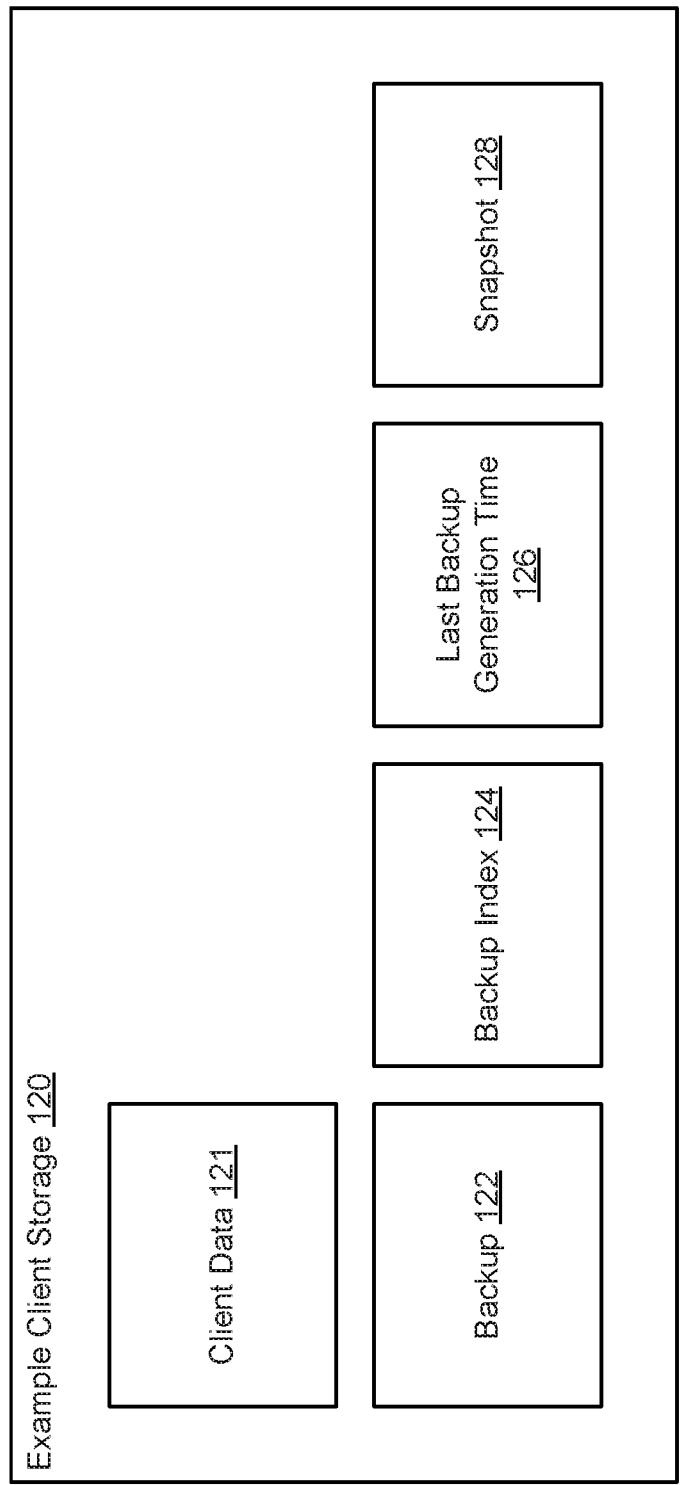
FIG. 1.2

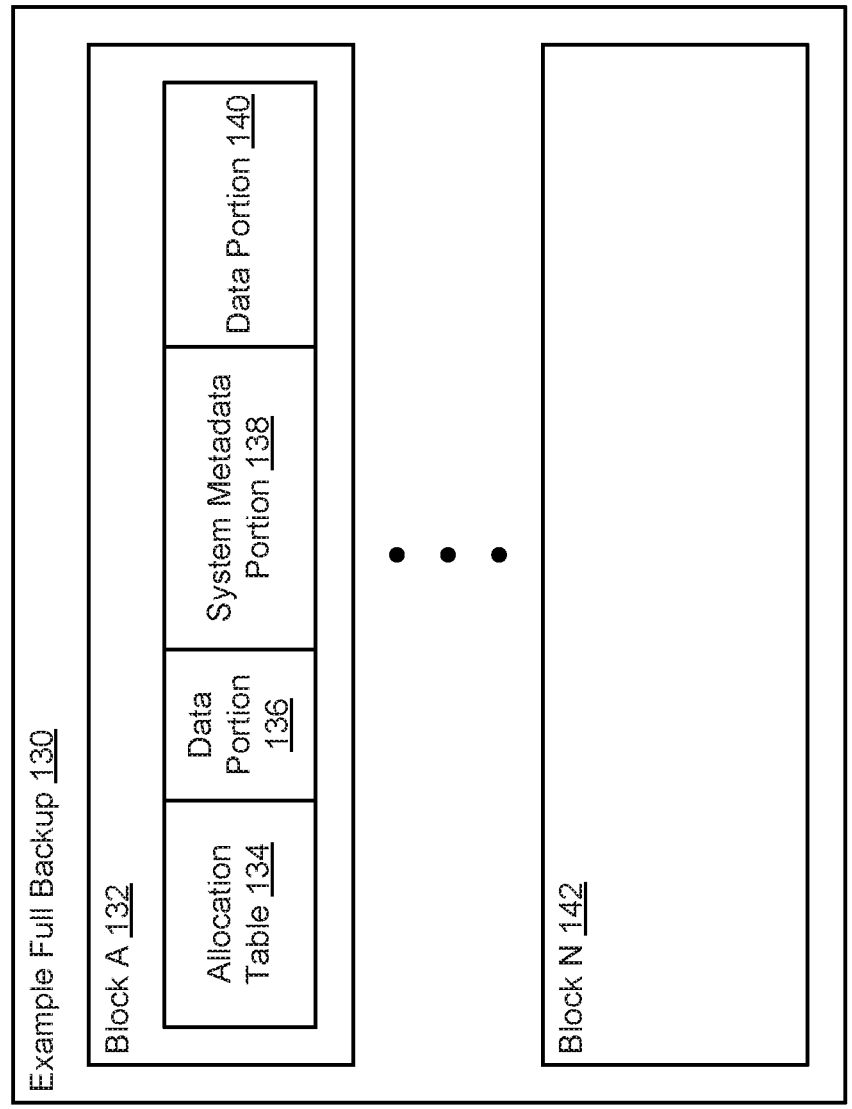
FIG. 1.3

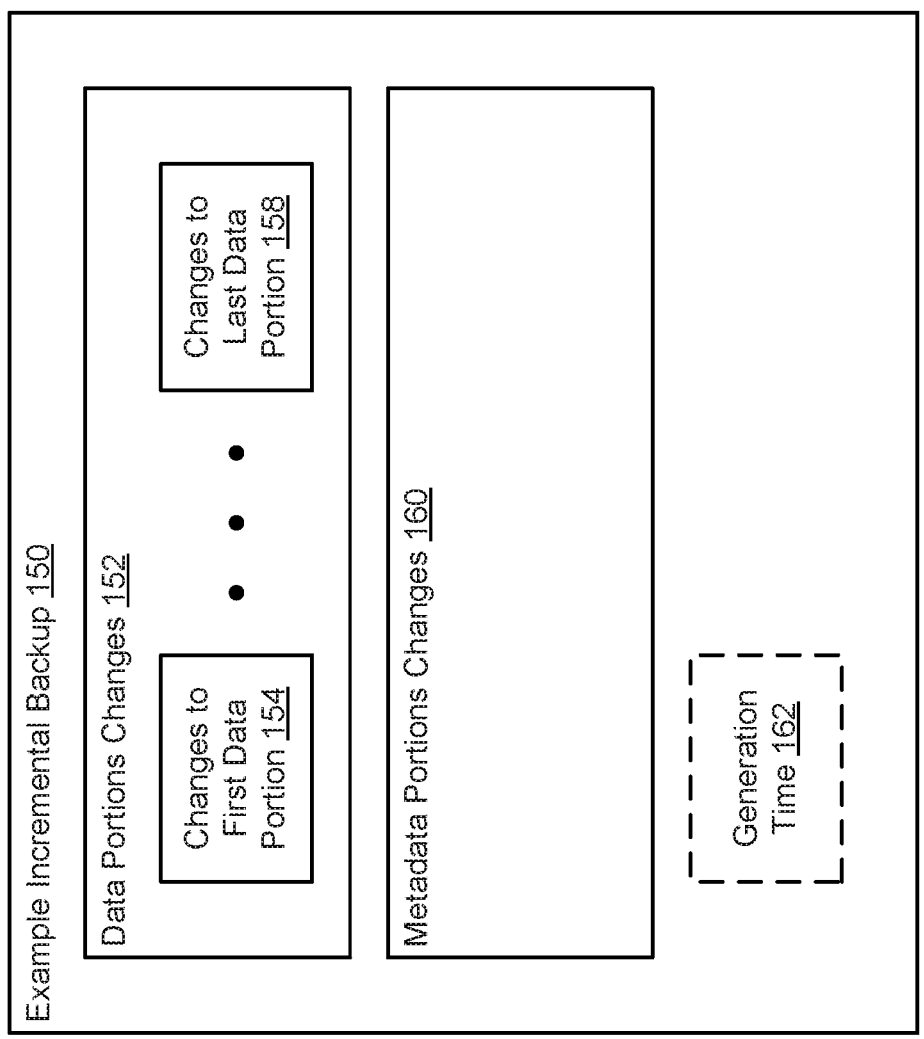
FIG. 1.4

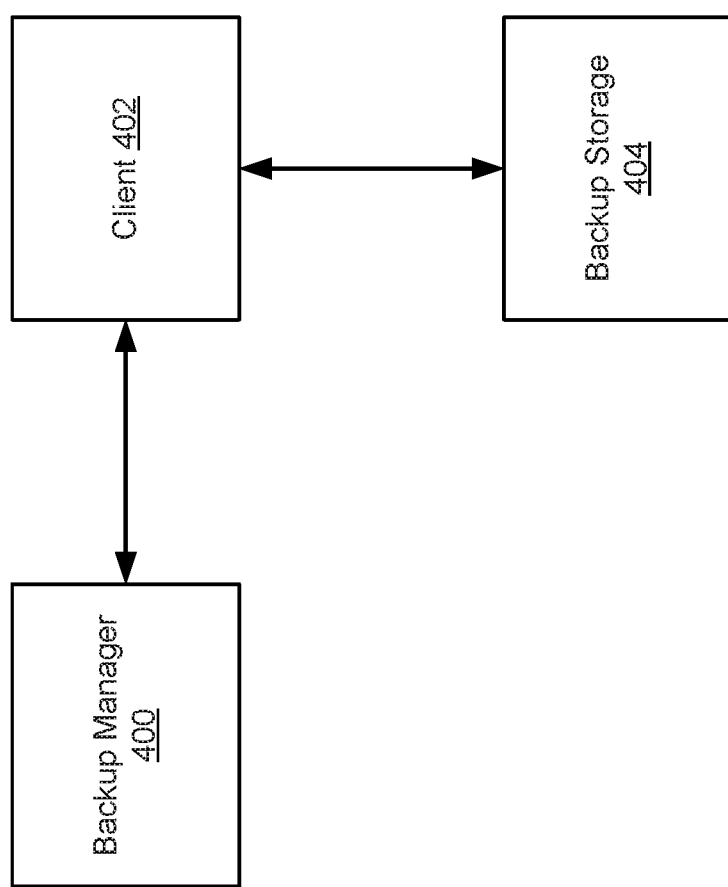
FIG. 4.1

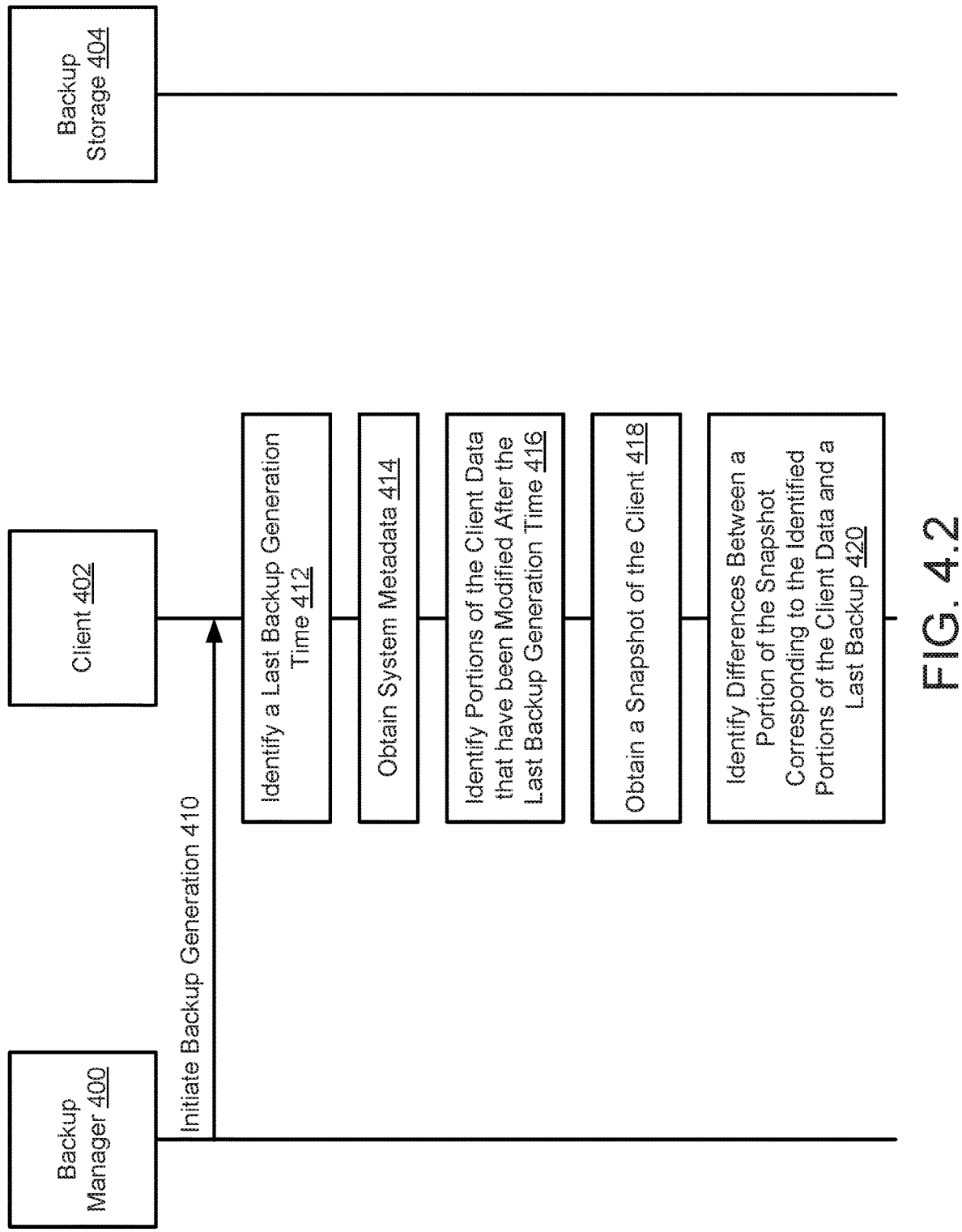

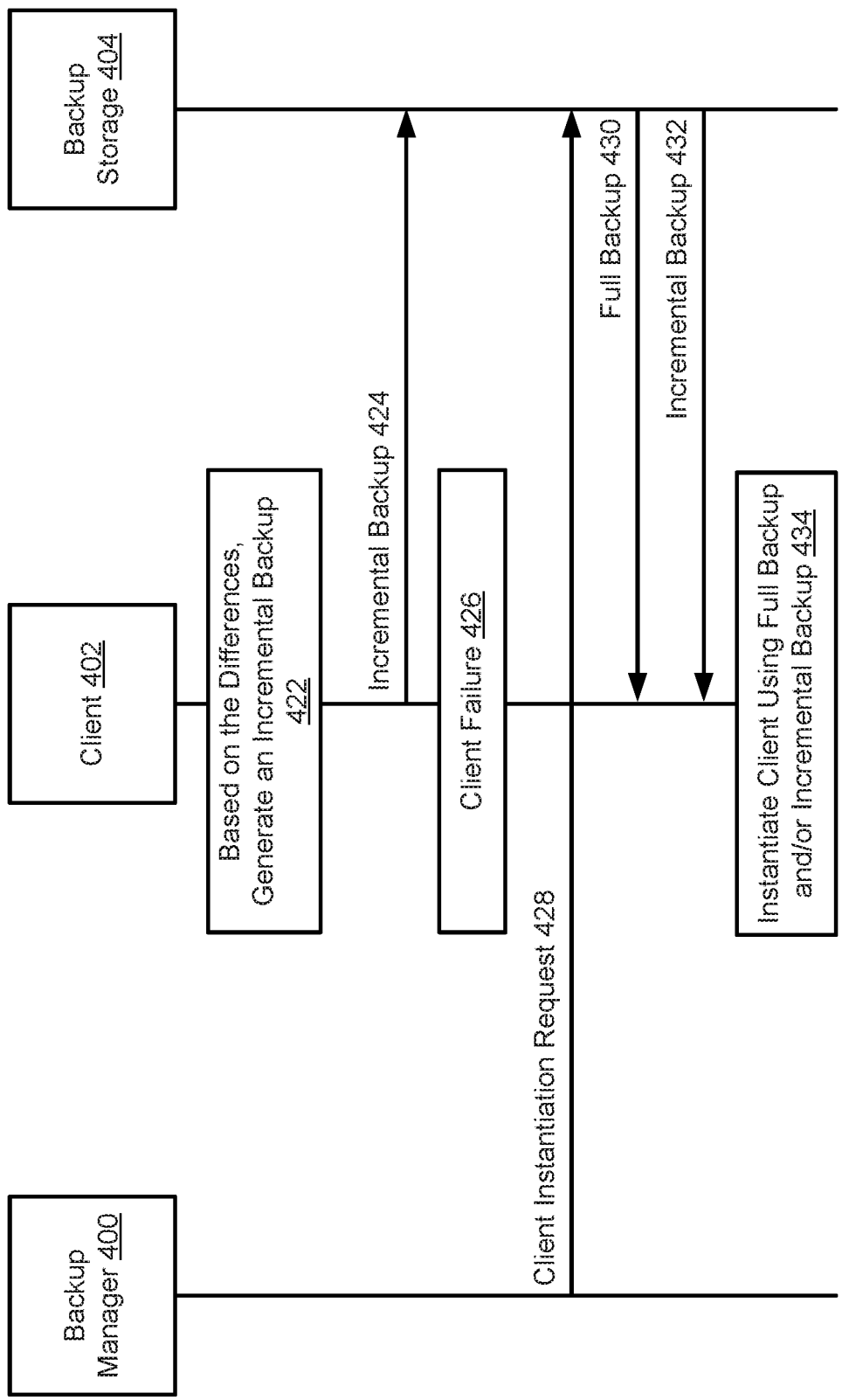
FIG. 4.3

SYSTEM AND METHOD FOR EFFICIENT BACKUP GENERATION

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a backup manager for providing backup services in accordance with one or more embodiments of the invention includes persistent storage and a backup orchestrator. The persistent storage includes protection policies. The backup orchestrator identifies a last backup generation time for a client in response to a protection policy of the protection policies triggering a backup generation for the client; obtains system metadata for the client; identifies a portion of client data that has been modified since the last backup generation time using the system metadata; generates an incremental backup based on the identified portion of the client data; and stores the incremental backup in backup storage.

In one aspect, a method for providing backup services in accordance with one or more embodiments of the invention includes identifying a last backup generation time for a client in response to a protection policy triggering a backup generation for the client; obtaining system metadata for the client; identifying a portion of client data that has been modified since the last backup generation time using the system metadata; generating an incremental backup based on the identified portion of the client data; and storing the incremental backup in backup storage.

In one aspect, a non-transitory computer readable medium in accordance with one or more embodiments of the invention includes computer readable program code, which when executed by a computer processor enables the computer processor to perform a method for providing backup services. The method includes identifying a last backup generation time for a client in response to a protection policy triggering a backup generation for the client; obtaining system metadata for the client; identifying a portion of client data that has been modified since the last backup generation time using the system metadata; generating an incremental backup based on the identified portion of the client data; and storing the incremental backup in backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example client storage in accordance with one or more embodiments of the invention.

FIG. 1.3 shows a diagram of an example full backup in accordance with one or more embodiments of the invention.

FIG. 1.4 shows a diagram of an example incremental backup in accordance with one or more embodiments of the invention.

FIG. 4.1 shows a diagram of an example system.

FIGS. 4.2-4.3 show diagrams of interactions between and actions performed by components of the example system of FIG. 4.1 over time.

DETAILED DESCRIPTION

Figure 2:
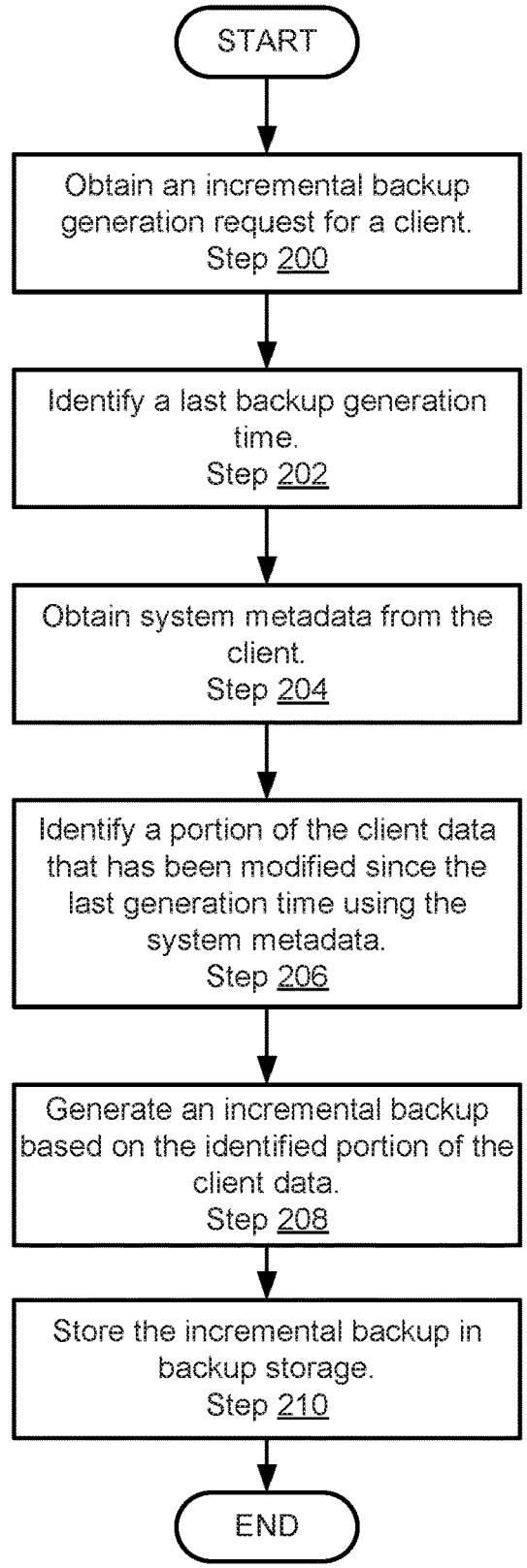
FIG. 2 shows a flowchart of a first method of providing backup services in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing backup services to clients or other types of devices. Backup services may include generating backups of the clients, storing the backups, and/or using the backups to restore clients to previous states.

Embodiments of the invention may provide a method for generating and storing backups in a computationally efficient manner. To generate a backup, a system in accordance with embodiments of the invention may use existing information to ascertain whether various portions of data have been modified over a predetermined period of time. When generating backups, the system may only take into account the portions of data that have been ascertained as having changed. By only taking into account the portions of data that have been ascertained as having changed, the total quantity of data considered for backup generation purposes may be reduced when compared to taking into account all data regardless of whether all portions of the data have been modified. By reducing the total quantity of data considered for backup generation purposes, the computing resource cost for generating the backup may be reduced. For example, taking into account more data for backup generation purposes may be more computationally costly than taking into account less data for backup generation purposes.

To identify the portions of the data that have been modified over a predetermined period of time, embodiments of the invention may monitor when backups for an entity have been generated. The monitoring may be used to identify the changes to data of the entity that have been taken into account in previously generated backups. Consequently, a system in accordance with embodiments of the invention may be able to efficiently identify changes to data that should be taken into account in new backups that are to be generated while excluding other changes that have already been taken into account in existing backups of the entity.

FIG. 1.1 shows a system in accordance with one or more embodiments of the invention. The system may include a client (104) that utilizes backup services provided by the backup manager (100), an agent (106) hosted by the client (104) that coordinates with the backup manager (100) to provide backup services, and/or a backup storage (110) that stores generated backups for future use. The backup manager (100) may include a backup orchestrator (102) that cooperates with the agent (106) to orchestrate generation and storage of backups. The backup services provided by the backup manager (100) may include (i) generation of backups of the client (104) in a computationally efficient manner, (ii) storing the backups in a backup storage (110), and/or (iii) utilizing backups of the client (104) stored in the backup storage (110) to restore the client (104) and/or provide data included in the stored backups.

Backups of the client (104) may be data structures that include data reflecting the state of the client (104) at a point of time (e.g., a full backup) and/or changes in the state of the client (104) over a period of time (e.g., an incremental backup). Different types of backups may be generated for efficiency purposes (e.g., incremental backups may be of a smaller size than full backups).

Different portions of the backup may correspond with different portions of the client's (104) data (e.g., files if a file system is used to organize the client's data or other types of data structures that may be employed by other types of data organization systems) at the point/period of time. Consequently, to provide access to the data included in the backups, the layout of data, metadata, and/or other types of information within generated backups may need to be generated.

The backups may be used to change the data of the client (104) to reflect the data at periods of time associated with backups. Once changed, the state of the client (104) may be similar to the state of the client when one or more of the backups were generated. Thus, the backups may be used to restore the operational state of the client (104) to previous operational states. The aforementioned functionality may be desirable, for example, to respond to scenarios in which the client (104) becomes inoperable due to data corruption, hardware issues that prevent the client (104) from operating, and/or for other reasons.

In some scenarios, it may be desirable to ascertain whether the client (104), during a previous operating state associated with backups stored in the backup storage (110), stored a particular portion of data. For example, the particular portion of data may be a version of a database, a file, or another type of data structure. The aforementioned determination may be used, for example, to select to which operating state to restore the client (104) when performing a restoration of the client (104), enable access to the particular portion of data by extracting it from a backup, and/or for other purposes.

To enable the backups to be searched, the system may store metadata regarding the contents of the backups that are stored in backup storage (110). The metadata may enable the contents of the backups to be searched without crawling the contents of the backups or employing other computationally costly search algorithms.

To store the metadata, system metadata may be used to generate indexes of the backups an index may be a data structure that specifies the layout of data, metadata, and/or other types of information included in a backup. The system metadata may be obtained by, for example, requesting the system metadata from a client or by reading the system metadata from the contents of the backup. Because a backup may use a similar organizational structure for storing data as that employed by the client, the system metadata may be read from the backup by ascertaining an organizational scheme employed by the client (104). For example, an operating system employed by the client (104) to manage its data may utilize a specific method for storing data, metadata, and other types of information within its storage resources. Consequently, once the organizational scheme for the client is identified, the layout of data, metadata, and other information employed by the backup may be similarly identified because both the backup and the client may employ the same organizational scheme.

Generation of backups may be a computationally expensive process. For example, generating a backup may consume processing cycles, memory space, storage space, etc. To reduce the quantity of consumed resources, the system of FIG. 1.1 may employ different methods of generating different types of backups. Some of the methods employed may be less computationally expensive than other methods and, consequently, may be preferentially used over other methods.

Embodiments of the invention may provide a method for generating backups in a manner that is computationally efficient. Specifically, embodiments of the invention may provide a method of generating incremental backups in a computationally efficient manner. An incremental backup may be a data structure that specifies changes made to the data of a client over a period of time. To generate incremental backups, embodiments of the invention may provide a method that utilizes system metadata of the client to ascertain which portions of the client data have been modified since the last backup was generated. Once identified, only changes to the ascertained portions of the client data may be calculated. Consequently, the computational cost for attempt to calculate differences for portions of the client data that are unchanged may be avoided resulting in generation of a backup in a manner that consume less time and computing resources than methods that may attempt to calculate changes made to portions of client data that didn't or are unlikely to have changed since the last backup was generated.

Each of the components of the system may be operably connected to each other and/or other entities not shown using any combination and quantity of wired and/or wireless networks. Each component of the system is discussed below.

The client (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The client (104) may be implemented using other types of computing devices without departing from the invention. For additional details regarding computing devices, refer to FIG. 5.

The client (104) may be implemented using logical devices without departing from the invention. For example, the client (104) may be implemented using virtual machines that utilize computing resources of any number of physical computing devices to provide the functionality of the client (104). The client (104) may be implemented using other types of logical devices without departing from the invention.

In one or more embodiments of the invention, the client (104) provides computer implemented services. A computer implemented service may be, for example, managing a database, serving files, and/or providing other types of services that may be utilized by users. The computing implemented services may be other types of services without departing from the invention.

When providing computer implemented services, the client (104) may generate and store data which the client (104) utilizes to provide the computer implemented services. For example, to provide database services, the client (104) may store information from a user in a database. The user may desire access to the information in the future. Consequently, the future availability of the data stored in the data may be valuable to the client (104).

Similarly, other entities may desire access to all, or a portion, of the client's data at future points in time. For example, other entities may desire to obtain access to information included in a database hosted by the client (104).

To improve the likelihood that such data is available in the future, the client (104) may utilize backup services provided by the backup manager (100). As discussed above, the backup services provided by the backup manager (100) may include orchestration of backup generation, storage of backups in the backup storage (110), and/or providing access to backups and/or information included in the backups (e.g., particular files).

To assist the backup manager (100) in providing backup services, the client (104) may host an agent (106). The agent (106) may orchestrate generation of backups of the client (104). To do so, the agent (106) may invoke functionality of the client (104) to generate the backup. For example, the agent (106) may invoke the functionality of the client (104) to cause the client (104) to enter a consistent state (e.g., flush buffers or other in-memory data structures) and generate a backup of all, or a portion, of the client data. Once generated, the agent (106) may generate a backup index for the generated backup. The backup index may reflect the content (e.g., different logical portions of the backup such as files) of the backup.

To generate the backup index, the agent (106) may utilize system metadata (or other types of metadata used to organize/describe logical portions of the client's data included in the backup) stored in the backup to generate the backup index. For additional details regarding backups and backup indexes, refer to FIGS. 1.2-1.3.

The agent (106) may be implemented using a logical entity. For example, the agent (106) may be implemented using computer instruction stored in persistent storage that when executed by a processor of the client gives rise to the agent (106). The agent (106) may be implemented using a physical device. For example, the agent (106) may be implemented using an integrated circuit having circuitry adapted to provide the functionality of the agent (106). The circuitry may be adapted to provide the functionality of the agent (106) by including different portions of circuitry that provide different portions of the functionality of the agent (106).

Figure 3:
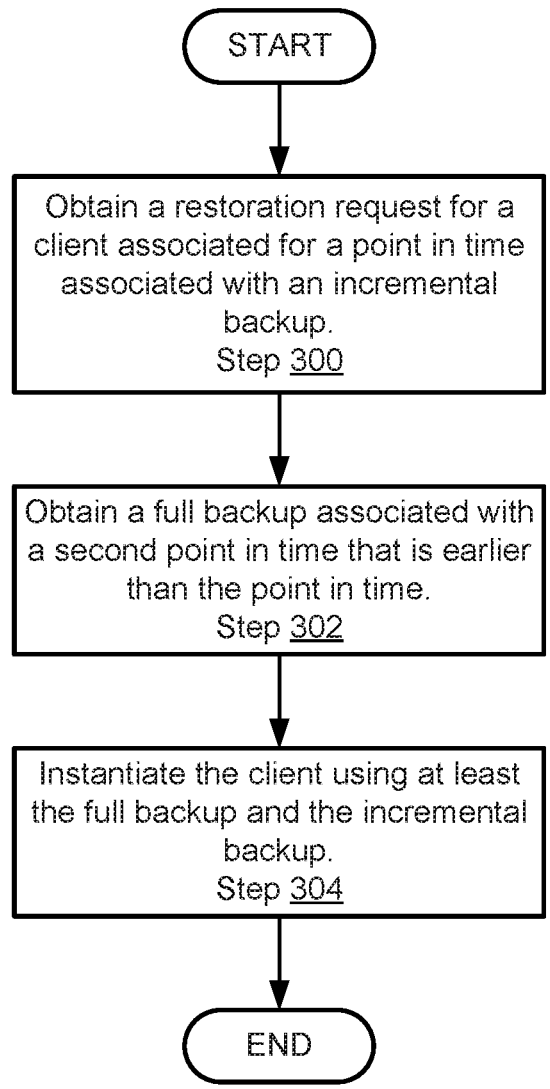
FIG. 3 shows a flowchart of a second method of providing backup services in accordance with one or more embodiments of the invention.

When providing its functionality, the agent (106) may perform all, or a portion, of the methods illustrated in FIGS. 2-3.

While the client (104) is illustrated in FIG. 1.1 as including an agent (106), the client (104) may include additional, fewer, and/or different components from those discussed above without departing from the invention.

The backup manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup manager (100) may be implemented using other types of computing devices without departing from the invention. For additional details regarding computing devices, refer to FIG. 5.

The backup manager (100) may be implemented using logical devices without departing from the invention. For example, the backup manager (100) may be implemented using virtual machines that utilize computing resources of any number of physical computing devices to provide the functionality of the backup manager (100). The backup manager (100) may be implemented using other types of logical devices without departing from the invention.

In one or more embodiments of the invention, the backup manager (100) provides backup services to the client (104) and/or other entities. Providing backup services may include (i) orchestrating generation of backups of the client (104), (ii) orchestrating storage of the backups in the backup storage (110), (iii) searching backups stored in the backup storage (110) for portions of data (e.g., particular files), (iv) providing data from the backups stored in the backup storage (110), and/or (v) orchestrating restoration of the client (104) using the backups stored in the backup storage (110).

To provide its functionality, the backup manager (100) may include a backup orchestrator (102) that provides the above noted functionality of the backup manager (100) and/or includes functionality to send messages to entities (e.g., an agent (106)) hosted by the client (104) to invoke functionality of the entities (e.g., agent (106)). For example, the agent (106) hosted by the client (104) may service requests from the backup manager (100). The agent (106) may, upon receipt of such requests, invoke functionality of the client (104) and/or its own functionality to service the requests from the backup manager (100).

The backup orchestrator (102) may be implemented using a logical entity. For example, the backup orchestrator (102) may be implemented using computer instruction stored in persistent storage that when executed by a processor of the client gives rise to the backup orchestrator (102). The backup orchestrator (102) may be implemented using a physical device. For example, the backup orchestrator (102) may be implemented using an integrated circuit having circuitry adapted to provide the functionality of the backup orchestrator (102). The circuitry may be adapted to provide the functionality of the backup orchestrator (102) by including different portions of circuitry that provide different portions of the functionality of the backup orchestrator (102).

The backup storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup storage (110) may be implemented using other types of computing devices without departing from the invention. For additional details regarding computing devices, refer to FIG. 5.

The backup storage (110) may be implemented using logical devices without departing from the invention. For example, the backup storage (110) may be implemented using virtual machines that utilize computing resources of any number of physical computing devices to provide the functionality of the backup storage (110). The backup storage (110) may be implemented using other types of logical devices without departing from the invention.

In one or more embodiments of the invention, the backup storage (110) provides data storage services to the client (104) and/or other entities. Data storage services may include storing data and providing copies of previously stored data. For example, backups of the client (104) and/or other entities may be stored in the backup storage (110) for storage.

The data stored in the backup storage (110) may include backups of the client (104) and/or backup indexes associated with the backups. Copies of the backup indexes may also be stored in the backup manager (100).

While the system of FIG. 1.1 has been illustrated as including a limited number of specific components, a system in accordance with embodiments of the invention may include additional, fewer, and/or different components without departing from the invention. For example, the system may include any number of clients (e.g., 104), backup managers (e.g., 100) that provide backup services to all or a portion of the clients, backup storages (110) that provide backup services to any number of entities, and/or other entities without departing from the invention. Any of the aforementioned components may cooperate to provide the above noted and later described functionality of the system of FIG. 1.1.

As discussed above, the client (104) may generate backups and backup indexes as part of the process of backing up the client's (104) data. To further clarify aspects of data stored by the client, a diagram of an example storage of the client (104) is illustrated in FIG. 1.2.

Turning to FIG. 1.2, FIG. 1.2 shows a diagram of an example client storage (120) in accordance with embodiments of the invention.

In one or more embodiments of the invention, the example client storage (120) is implemented using devices that provide data storage services (e.g., storing data and providing copies of previously stored data). The devices that provide data storage services may include hardware devices and/or logical devices. For example, the example client storage (120) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the example client storage (120) may include a memory device (e.g., a dual in line memory device) in which data is stored and from which copies of previously stored data are provided. In another example, the example client storage (120) may include a persistent storage device (e.g., a solid state disk drive) in which data is stored and from which copies of previously stored data is provided. In a still further example, the example client storage (120) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example client storage (120) may store data structures including client data (121), a backup (122), a backup index (124), a last backup generation time (126), and/or a snapshot (128). Each of these data structures is discussed below.

The backup (122) may be a data structure that includes information regarding the state of the client (104, FIG. 1.1) at a point in time, changes to the state of the client (104, FIG. 1.1) over a period of time, and/or other types of information reflecting the state of the client. The backup (122) may be usable, in isolation or in combination with other backups, to restore a state of the client (104, FIG. 1.1) to a previous state associated with the backup (122) and/or other backups.

The client data (121) may be a data structure that includes data, system metadata, and/or other types of information (e.g., organizational information such as allocation tables). The client (104, FIG. 1.1) may use the client data (121) during its operation. For example, the client may store its data in the client data, may store system metadata that the client utilizes to use the data, and/or organizational information that describes where in the storage resources allocated to the client different portions of the client's data and the system metadata are located. The client data (121) may be managed by, for example, an operating system of the client.

The backup (122) may be a data structure that includes information that may be used to restore the client (104, FIG. 1.1) to a previous state. For example, the backup (122) may include data reflecting the client data (121) at a point in time (e.g., a full backup) or changes to the client data (121) over a period of time (e.g., an incremental backup). The backup (122) may be usable, in isolation or in combination with other backups (e.g., an incremental backup usable in combination with a full backup), to restore a state of the client (104, FIG. 1.1) to a previous state associated with the backup (122) and/or other backups.

For example, a backup that reflects the state of the client (104, FIG. 1.1) at a point in time may include a copy of all, or a portion, of the client data (121) at a point in time (e.g., a full backup). Such a backup may be implemented as, for example, an image of the client (or a portion of the client).

In another example, a backup that reflects changes to the state of the client (104, FIG. 1.1) over a period of time may include changes made to all, or a portion, of the client data (121) over the period of time. Such a backup may be implemented as, for example, a list of modifications to all of the client's data (e.g., an incremental backup) or a list of modifications to a particular portion of the client's data (e.g., a transaction log from an application hosted by the client). Backups that reflect changes to the state of the client over a period of time may be used in combination with at least one other backup that reflects the state of the client at a point in time (e.g., the state of the client at a point in time in combination with changes to the state of the client over a period of time may be used to derive the state of the client at a second point in time). Multiple backups that reflect changes to the state of the client over multiple periods of time may be used in combination (e.g., chaining) to derive the state of the client at any number of different points in time.

The backup (122) may have an organizational structure that reflects the organizational structure utilized by the client to organize its data (e.g., the client data (121)). Consequently, the backup (122) may include organization data (e.g., allocation tables) that specifies the logical arrangement of client data and/or system metadata within the backup. For additional details regarding the arrangement of client data and/or system metadata within the backups, refer to FIGS. 1.3-1.4.

The backup index (124) may be a data structure that includes information regarding different portions of data included in the backup (122). The information may include where different portions of the data are disposed within the backup (122) and/or information regarding the content of each of the different portions of the data.

For example, the backup index (124) may specify locations (e.g., offsets, lengths, etc.) of the backup that correspond to logical portions (e.g., files) of the client data (121). The backup index (124) may also specify information (e.g., name, creation date, type, description of the contents, etc.) regarding the content of each of the logical portions of the backup.

The backup index (124) may be used to enable the contents of the backup (122) to be searched and/or to enable particular portions of the content of the backup (122) to be obtained. When initially generated, the layout of data within the backup (122) may be unknown.

The backup index (124) may be implemented as a table that specifies both information regarding each portion of the backup and where each portion of the backup is disposed within the backup (122). Consequently, when a desirable portion of the client data (121) is identified using the information regarding the a corresponding portion of the backup, the corresponding information regarding the location of the desirable portion within the backup may be used to read or otherwise access the portion of the backup (122) corresponding to the desirable portion.

In one or more embodiments of the invention, the backup index (124) is generated without crawling (e.g., reading the client's data included in the backup (122) and deriving information based on the read client's data of the backup (122)) the backup (122). Rather, the backup index (124) may be generated based on (i) organization information included in the backup (122) and/or (ii) system metadata obtained from the backup (122) and/or the client. By doing so, the backup index (124) may be generated without expending computing resources on analyzing the portions of the backup. For example, the preexisting system metadata that already includes information regarding the client data may be utilized to generate the backup index (because the client data (121) and the backup (122) may use a similar data organization scheme).

The last backup generation time (126) may be a data structure that specifies the time associated with the last backup that was generated for the client. The time may be used to delineate changes to the client data (121) that were taken into account when generating the backup (122). Consequently, changes to the client data (121) after the last backup generation time (126) may not be reflected in the backup (122).

The snapshot (128) may be a data structure that includes information used to generate a backup. For example, the snapshot may reflect the client data (121) at a point in time. The snapshot (128) may be used to generate a full backup by using the snapshot (128) as the full backup or by generating an incremental backup by identifying differences between the snapshot (128) and the state of the client when the last backup was generated. To generate an incremental backup in a computationally efficient manner, the system may utilize the last backup generation time (126) and system metadata to identify a portion of the snapshot (128) that includes changes and a second portion of the snapshot (128) that does not include changes since the last backup was generated. Consequently, only differences between the portions of the snapshot (128) that includes changes may be used to generate the incremental backup. In other words, the second portion of the snapshot (128) may not be evaluated to identify whether a difference is present. Consequently, the computational cost for generating an incremental backup may be reduced when compared to generating an incremental backup by attempting to calculate differences for all portions of the snapshot (128).

While the example client storage (120) has been illustrated as including data structures including a limited amount of specific information, any of the data structures stored in the example client storage (120) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

To further clarify aspects of backups, a diagram of an example full backup (130) in accordance with one or more embodiments of the invention is illustrated in FIG. 1.3 and a diagram of an example incremental backup (150) in accordance with one or more embodiments of the invention is illustrated in FIG. 1.4. Turning to FIG. 1.3, the example full backup (130) may store information regarding the state of the client (104, FIG. 1.1). The example full backup (130)

may reflect a state of the client (104, FIG. 1.1) at a point in time. However, the description provided below may be applicable to other types of backups that reflect changes to the client's state over corresponding periods of time such as the example incremental backup discussed with respect to FIG. 1.4 below.

The example full backup (130) may include any number of blocks (132, 142) that corresponding to blocks of an organization scheme employed by the client (104, FIG. 1.1) to store data. A block may be a chunk of storage resources (e.g., a number of bits). The size of the blocks may correspond to a minimum addressable unit of storage resources.

Each of the blocks (132, 142) may include bits that the client (104, FIG. 1.1) may use to store information. The client (104, FIG. 1.1) may store information using the bits of each of the blocks that reflects (i) organization information (e.g., any number of allocation tables (e.g., 134)) used by the client to organize its data, (ii) the client's data (e.g., any number of data portions (e.g., 136, 140), and/or (iii) system metadata (e.g. any number of system metadata portions (e.g., 138)) that includes information regarding any number of logical portions of the client's data. Different blocks of the example full backup (130) may include different types of information.

The arrangement of organization information, client data, and system metadata within each of the blocks may correspond to the manner in which the client organizes its data. For example, if the client runs a first type of operating system, the client may store different portions of the aforementioned types of information in a manner consistent with the first type of operating system. If the client runs a second type of operating system, the client may store different portions of the aforementioned types of information in a manner consistent with the second type of operating system. Thus, the arrangement of organizational information, client data, and system metadata within a backup may be identifiable based on the type of operating system (or other type of data organization system) utilized by the client.

To generate backup indexes, embodiments of the invention may provide a method that utilizes organizational information and system metadata already present within backups and that was previously generated by the client to generate backup indexes. For example, based on an operating system employed by the client, a method in accordance with embodiments of the invention may include (i) identifying the location of organization information (e.g., one or more allocation tables (134) or other types of data structures that specify the relative location of logical portions of client data and/or system metadata) within a backup, (ii) reading the organization information to identify the location of data and system metadata, (iii) reading the system metadata, and (iv) generating the backup index using the system metadata and relative logical portions of the client data.

As discussed above, blocks may store different types of information to enable a client to organize its data. The blocks may include, for example, organizational information such as an allocation table (134). An allocation may be any number of bits that specify the location of logical portions of client data (e.g., data portions (136, 140)) and/or system metadata that includes information regarding the logical portions of the client data within a backup.

For example, an allocation table (134) may specify block identifier(s), an offset, a length, and/or other types of information that enables one or more logical portions of client data and/or system metadata to be identified as being stored within the bits of the blocks. While the organizational information has been described with respect to an allocation table (134), the organization information may be other types of data structures, include different types of information, and/or other enables client data and/or system metadata to be identified within a backup.

The blocks (132, 142) may also include any number of logical portions of client data and/or system metadata associated with the logical portions of the client data. The logical portions of the client data may include, for example, files or other types of data structures used by the client to store data. The system metadata may specify information regarding the logical portions of the client data such as, for example, names, creation dates, information describing the contents, and/or other types of information associated with the logical portions of the client's data.

While the example full backup (130) has been illustrated as including data structures including a limited amount of specific information, any of the data structures included in the example full backup (130) may include addition, less, and/or different information without departing from the embodiments of the invention. Any of the aforementioned data structures may be implemented using, for example, lists, tables, linked lists, databases, and/or other types of data structures.

Turning to FIG. 1.4, FIG. 1.4 shows a diagram of an example incremental backup (150) in accordance with one or more embodiments of the invention. The example incremental backup (150) may include data portion changes (152), metadata portion changes (160), and a generation time (162).

The data portions changes (152) may include any number of changes (e.g., 154, 158) to various portions of the client data that have been made since the last backup was generated. Each of the changes to the data portions (e.g., 154, 158) may be identified by utilizing system metadata to identify portions of the client data that have changed. Differences for each of the identified portions of the client data may then be determined by comparing the current information included in the identified portions of the client data to the past information that was included in the identified portions when the last backup was generated. By only performing comparisons for the identified portions of the client data (rather than all of the portions of the client data), the computational cost generating the data portion changes (152) of the example incremental backup (150) may be reduced.

The example incremental backup (150) may also include metadata portion changes (160). Similar to the data portion changes (152), the metadata portion changes (160) may include any number of changes made to various portions of the client metadata. The metadata portion changes (160) may be obtained in a manner similar to that of the data portion changes (152).

The example incremental backup (150) may also include a generation time (162) for the example incremental backup (150). The generation time (162) may delineate changes to the client data that are taken into account in the example incremental backup (150) from changes to the client data (e.g., changes made after the generation time (162)) that are not taken into account in the example incremental backup (150). While the generation time (162) is illustrated as being a portion of the example incremental backup (150), the generation time (162) is illustrated using a dashed boarder to indicate that the generation time (162) may be stored separately from the example incremental backup (150). For example, the generation time (162) may be stored as the last backup generation time (126, FIG. 1.2) (and/or an additional copy may be stored as the last backup generation time), as discussed with respect to FIG. 1.2.

While the example incremental backup (150) has been illustrated as including data structures including a limited amount of specific information, any of the data structures included in the example incremental backup (150) may include addition, less, and/or different information without departing from the embodiments of the invention. Any of the aforementioned data structures may be implemented using, for example, lists, tables, linked lists, databases, and/or other types of data structures.

As discussed above, the system of FIG. 1.1 may generate and/or utilize backups when providing backup services to the client (e.g., 104, FIG. 1.1) and/or other entities. FIGS. 2-3 show methods that may be performed by components of the system of FIG. 1.1 to provide backup services.

FIG. 2 shows a flowchart of a method in accordance with one or more embodiments of the invention. The method depicted in FIG. 2 may be used to provide backup generation services in accordance with one or more embodiments of the invention. The method shown in FIG. 2 may be performed by, for example, a backup manager (e.g., 100, FIG. 1.1). Other components of the system in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, an incremental backup generation request for a client is obtained.

The incremental backup generation request may be obtained based on a protection policy associated with the client. The protection policy may specify when and what type of backup is to be generated to provide backup services to the client. The incremental backup generation request may be obtained from other entities and/or via other methods without departing from the invention.

In step 202, a last backup generation time is identified. As discussed with respect to FIGS. 1.2 and 1.4, the last time that a backup was generated for the client may be recorded (e.g., stored in storage). The stored last backup generation time may be utilized to identify the last backup generation time.

In step 204, system metadata from the client is obtained. The system metadata may be obtained by, for example, requesting the system metadata from the client or reading the system metadata from a snapshot or backup associated with the client. The system metadata may specify, in part, when each portion of the client's data was last modified.

In step 206, a portion of the client's data that has been modified since the last backup generation time is identified using the system metadata. To identify the portion of the client's data, the last backup generation time may be compared to the last modification times for each portion of the client's data specified by the system metadata. Any portion of the client's data that was modified after the last generation time may be identified as part of the client's data that has been modified since the last backup generation time.

In step 208, an incremental backup is generated based on the identified portion of the client's data.

In one or more embodiments of the invention, the incremental backup is generated by determining the changes that have been made to each portion of the client's data specified by the identified portion of the client's data. The determined changes may be used to generate the incremental backup. For example, a data structure that includes all of the determined changes may be used as the incremental backup.

A change to the client's data may specify differential information. Differential information may specify changes that have occurred to data rather than the data itself. For example, consider a scenario in which data specifies the value of 8. At a second point in time, the value of the data may change to 12. The difference between these two values may be the value 4. To ascertain the value of the data at the second point in time, the difference of four may be added to the value of 8 at the first point in time to obtain the value of 12 at the second point in time. Thus, differential information may need to be used in combination with a known value at a point in time to derive a second value at a second point in time. Because many values of data may not change over periods of time, the amount of data required to represent changes (rather than the values) to client data may be substantially less than the data represent values of the client data.

To generate differential information, a snapshot of the client's data may be generated. The snapshot may reflect the client's data at the point in time that the snapshot is generated. The snapshot may use an organizational scheme similar to that utilized by the client organize its data. Consequently, information included in the system metadata may be used to identify portions of the snapshot corresponding to the portion of the client data identified in step 206. The identified portions of the snapshot may then be compared to (i) a snapshot used to generate a last backup, (ii) the last generated backup, and/or (iii) any other type of data structure that reflects the client data at the point in time the last backup was generated. The comparison may be used to identify differences which may be used as the differential information.

When the incremental backup is generated, the point in time associated with the snapshot may be used as the last backup generation time, as discussed with respect to FIGS. 1.2 and 1.4. In other words, copies of the point in time may be stored as part of the incremental backup and/or in other locations such as in a backup manager and/or storage of the client for future use.

In step 210, the incremental backup is stored in backup storage. The incremental backup may be stored in backup storage by sending a copy of the incremental backup and/or an index associated with the incremental backup to the backup storage for storage. Copies of the backup and/or the backup index may alternatively, or in addition, be stored in other locations without departing from the invention.

The method may end following step 210.

Using the method illustrated in FIG. 2, a system in accordance with embodiments of the invention may generate incremental backups in a computationally efficient manner. For example, the method may only compare portions of the data in a snapshot to previous versions of client data. By avoiding comparing all of the data in the snapshot to previous versions of client data, the computational cost for identifying differences (e.g., generating differential information) may be reduced.

Throughout the method illustrated in FIG. 2, the backup manager (100, FIG. 1.1) may send messages to the agent (106, FIG. 1.1) to cause the method illustrated in FIG. 2 to be performed. The backup manager (100, FIG. 1.1) may cause the backup to be generated based on protection policies or other information that specifies when backups for entities should be generated to meet data integrity requirements.

When providing backup services, the system of FIG. 1.1 may utilize backups to perform restorations of entities. FIG. 3 shows a flowchart of a method in accordance with one or more embodiments of the invention. The method depicted in FIG. 3 may be used to restore an entity in accordance with one or more embodiments of the invention. The method shown in FIG. 3 may be performed by, for example, a backup manager (e.g., 100, FIG. 1.1). Other components of the system in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a restoration request for a client is obtained. The restoration request is associated with a point in time that is associated with an incremental backup. The association may be that the restoration request specifies that the client is to be restored to the point in time and that the incremental update may be used to restore the client to the point in time (in combination with at least one other full backup).

The restoration request may be obtained, for example, when it is determined that the client has entered a failed state in which the client has stopped operating. In other words, the client may be unable to provide its services while in the failed state. Another entity that sent the restoration request may desire access to services provided by the client but is unable to obtain the services due to the client being in the failed state.

In step 302, a full backup that is associated with a second point in time that is earlier than the point in time is obtained. The full backup may be obtained by requesting the full backup from the backup storage in which the full backup is stored. The full backup may be usable in combination with the incremental backup to restore the client to the point in time of step 300.

In step 304, the client is instantiated using at least the full backup and the incremental backup. The client may be instantiated by providing a copy of at least the full backup and the incremental backup to a computing device that will host the client. The computing device may allocate computing resources (e.g., storage space) for the client. The full backup may be copied to the allocated computing resources and the incremental backup (alone or in combination with other incremental backups) may be used to modify the data included in the copy of the full backup to match client data at the second point in time.

For example, the changes specified by the incremental backup may be applied to the copy of the full backup. By doing so, computing resources allocated to the client may include a copy of the client data at the point in time.

After storing the copy of the full backup in the allocated computing resources and modifying the copy of the full backup using the incremental backup, execution of computing instructions associated with the client may be initiated. By doing so, an executing entity (e.g., the client) may be instantiated in a state that matches the state of the client at the point in time of step 300.

The method may end following step 304.

Using the method illustrated in FIG. 306, an instance of a client may be instantiated in a state matching the state of the client at a particular point in time. For example, by modifying the data stored in computing resources allocated to the new instance of the client, the new instance of the client may operate in a manner consistent with the state of the client at the particular time. Consequently, entities may obtain services provided by the new instance of the client in a manner consistent with the state of the client at the particular point in time.

To further clarify embodiments of the invention, a non-limiting example is provided in FIGS. 4.1-4.3. FIG. 4.1 may illustrate a system similar to that illustrated in FIG. 1.1. FIGS. 4.2-4.3 may illustrate interactions between components and/or actions performed by the components of the system of FIG. 4.1 over time. For the sake of brevity, only a limited number of components of the system of FIG. 1.1 are illustrated in each of FIGS. 4.1-4.3.

EXAMPLE

Consider a scenario as illustrated in FIG. 4.1 in which a backup manager (400) is providing backup services to a client (402). When providing backup services, the backup manager (400) may orchestrate storage of backups in a backup storage (404).

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 410 indicates the first interaction that occurs in time while element 434 indicates the last interaction that occurs.

Turning to FIG. 4.2, at a first point in time, the backup manager (400) initiates a backup generation (410) for the client (402). The initiated backup generation (410) may be for an incremental backup of the client.

In response to the backup generation (410) being initiated, the client (402) identifies a last backup generation time (412). The last backup generation time (412) may be a data structure that specifies the point in time up to which changes to the data of the client (402) have been taken into account in previously generated backups. The data structure may have been generated when the last backup of the client (402) was generated.

After identifying the last backup generation time (412), the client (402) obtains system metadata (414) that specifies, in part, when each portion of the data of the client (402) was last modified. The system metadata (414) may be obtained from the client (402) or from a snapshot of the client (402).

After obtaining the system metadata (414), the client (402) identifies portions of the data of the client that have been modified after the last backup generation time (416). To do so, the client (402) may compare the last modification date, obtained from the system metadata, for each corresponding portion of the data of the client (402). All portions of the data of the client that have a last modification time that is later than the last backup generation time may be identified as part of the portions of the client data that have been modified after the last backup generation time.

After identifying the portions of the client data, the client (402) obtains a snapshot of the client (418). The snapshot may be obtained by reading it from storage of the client (402). The snapshot may have been generated by an entity hosted by the client (402) such as an agent.

After obtaining the snapshot, the client (402) identifies differences between a portion of the snapshot corresponding to the identified portions of the client data and a last backup (420) of the client. The differences may be differential information, as discussed above. Consequently, changes to the client data after the last backup generation time and up to the point in time in which the snapshot of the client (418) was generated may be included in the identified differences.

After identifying the differences, the client may generate an incremental backup (422). The incremental backup may be based on the identified differences. For example, a data structure that lists the differences may be generated as the incremental backup.

After generating the incremental backup (422), the client (402) sends the incremental backup (424) to the backup storage (404) for storage.

After the incremental backup (424) is stored in the backup storage (404), a client failure (426) occurs due to a software bug that results in the data of the client (402) being corrupted. Consequently, the client (402) is unable to provide services to other entities.

After failure of the client, the backup manager (400) sends a client instantiation request (428) to the backup storage (404). The client instantiation request requests that the client (402) be restored to a state associated with the incremental backup (424) stored in the backup storage (404).

In response to receiving the client instantiation request (428), the backup storage (404) sends a full backup (430) and the incremental backup (432) associated with the client (402) to the computing device that hosts the client (402).

In response to receiving the full backup (430) and the incremental backup (432), the computing devices instantiates the client using the full backup and the incremental backup (434). Specifically, the computing device overwrites the data stored in computing resources allocated to the client using the full backup (430) and then modifies the overwritten data using the incremental backup (432). The computing device then initiates of computer instructions corresponding to the client (402) which gives rise to an executing instance of the client (402).

Once instantiated, the client (402) is able to provide its services in a manner consistent with the state of the client (402) prior to the client failure (426).

End of Example

Thus, as illustrated in FIGS. 4.1-4.3, embodiments of the invention may provide a method for providing backup services in a manner that is computationally efficient. For example, by generating the incremental backup based on only a portion of the data included in the snapshot, the computational cost for generating the backup may be reduced when compared to generating a backup based on all of the data included in the snapshot.

Figure 5:
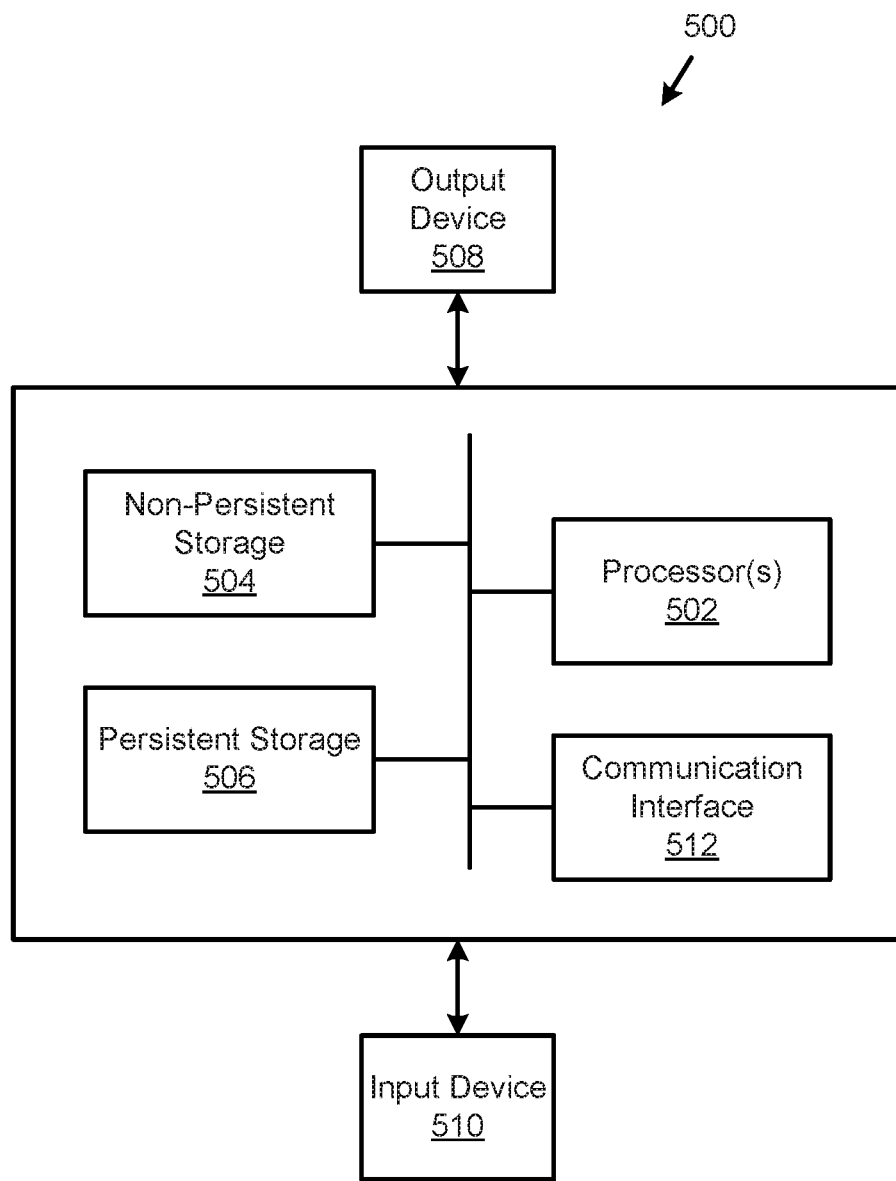
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method for providing backup services. To do so, embodiments of the invention may provide a system that generates backups in a computationally efficient manner. Specifically, embodiments of the invention may provide a method for generating an incremental backup that utilizes existing information (e.g., system metadata) to exclude a portion of the entities data for which a backup is being generated from consideration for backup generation purposes. By doing so, the quantity of computing resources expended for generating the backup may be reduced when compared to considering all of the client's data when generating a backup.

Thus, embodiments of the invention may address the problem of limited computational resource availability for providing backup services in a distributed environment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A backup manager for providing backup services, comprising:
 a processor comprising circuitry;
 memory;
 persistent storage for storing protection policies; and
 a backup orchestrator, executing on the processor, using the memory, and programmed to, in response to a protection policy of the protection policies triggering a backup generation for the client:
  identify a last backup generation time for a client, wherein the last backup generation time is associated with a last generated backup of the client;

obtain system metadata for the client;
identify a portion of client data that has been modified since the last backup generation time using the system metadata;
generate a snapshot of the client data;
compare portions of the snapshot corresponding to the identified portion of the client data to corresponding portions of the last generated backup of the client, rather than compare all portions of the snapshot to all portions of the last generated backup of the client, to identify changes between the snapshot and the last generated backup of the client;
generate an incremental backup comprising the identified changes between the snapshot and the last generated backup of the client; and
store the incremental backup in backup storage,
wherein identifying the portion of the client data that has been modified since the last backup generation time using the system metadata comprises:
generating, without crawling the incremental backup, a backup index based on the system metadata;
comparing a last modification date specified for each logical portion of the client data described by the backup index to the last backup generation time to identify each subset of the logical portions of the client data that was modified after the last backup generation time; and
using the subset of the logical portions of the client data as the portion of the client data.

2. The backup manager of claim 1, wherein the backup orchestrator is further programmed to:
obtain a restoration request for the client at a point in time associated with the incremental backup;
identify a full backup associated with a second point in time that is earlier than the point in time; and
restore the client using the full backup and the incremental backup.

3. The backup manager of claim 2, wherein the incremental backup comprises:
changes to the portion of the client data that were made after the last backup generation time and prior to the point in time associated with the incremental backup.

4. The backup manager of claim 1, wherein each logical portion of the client data comprises a respective file.

5. The backup manager of claim 1, wherein the backup index specifies offsets to copies of logical portions of the client data in the incremental backup.

6. A method for providing backup services, comprising:
in response to a protection policy triggering a backup generation for the client:
identifying a last backup generation time for a client, wherein the last backup generation time is associated with a last generated backup of the client;
obtaining system metadata for the client;
identifying a portion of client data that has been modified since the last backup generation time using the system metadata;
generating a snapshot of the client data;
comparing portions of the snapshot corresponding to the identified portion of the client data to corresponding portions of the last generated backup of the client, rather than comparing all portions of the snapshot to all portions of the last generated backup of the client, to identify changes between the snapshot and the last generated backup of the client;
generating an incremental backup comprising the identified changes between the snapshot and the last generated backup of the client; and
storing the incremental backup in backup storage,
wherein identifying the portion of the client data that has been modified since the last backup generation time using the system metadata comprises:
generating, without crawling the incremental backup, a backup index based on the system metadata;
comparing a last modification date specified for each logical portion of the client data described by the backup index to the last backup generation time to identify each subset of the logical portions of the client data that was modified after the last backup generation time; and
using the subset of the logical portions of the client data as the portion of the client data.

7. The method of claim 6, further comprising:
obtaining a restoration request for the client at a point in time associated with the incremental backup;
identifying a full backup associated with a second point in time that is earlier than the point in time; and
restoring the client using the full backup and the incremental backup.

8. The method of claim 7, wherein the incremental backup comprises:
changes to the portion of the client data that were made after the last backup generation time and prior to the point in time associated with the incremental backup.

9. The method of claim 6, wherein each logical portion of the client data comprises a respective file.

10. The method of claim 6, wherein the backup index specifies offsets to copies of logical portions of the client data in the incremental backup.

11. A non-transitory computer readable medium comprising computer readable program code, which when executed by a computer processor enables the computer processor to perform a method for providing backup services, the method comprising:
in response to a protection policy triggering a backup generation for the client:
identifying a last backup generation time for a client, wherein the last backup generation time is associated with a last generated backup of the client;
obtaining system metadata for the client;
identifying a portion of client data that has been modified since the last backup generation time using the system metadata;
generating a snapshot of the client data;
comparing portions of the snapshot corresponding to the identified portion of the client data to corresponding portions of the last generated backup of the client, rather than comparing all portions of the snapshot to all portions of the last generated backup of the client, to identify changes between the snapshot and the last generated backup of the client;
generating an incremental backup comprising the identified changes between the snapshot and the last generated backup of the client; and
storing the incremental backup in backup storage,
wherein identifying the portion of the client data that has been modified since the last backup generation time using the system metadata comprises:
generating, without crawling the incremental backup, a backup index based on the system metadata, which specifies offsets to copies of logical portions of the client data in the incremental backup;

comparing a last modification date specified for each logical portion of the client data described by the backup index to the last backup generation time to identify each subset of the logical portions of the client data that was modified after the last backup generation time; and using the subset of the logical portions of the client data as the portion of the client data.

12. The non-transitory computer readable medium of claim 11, wherein the method further comprises:

obtaining a restoration request for the client at a point in time associated with the incremental backup;

identifying a full backup associated with a second point in time that is earlier than the point in time; and restoring the client using the full backup and the incremental backup.

13. The non-transitory computer readable medium of claim 12, wherein the incremental backup comprises:

changes to the portion of the client data that were made after the last backup generation time and prior to the point in time associated with the incremental backup.

* * * * *